(12) United States Patent
Juvonen (10) Patent No.: US 8,118,112 B2
(45) Date of Patent: Feb. 21, 2012

(54) ROCK BREAKING DEVICE, PROTECTION VALVE AND A METHOD OF OPERATING A ROCK BREAKING DEVICE

(75) Inventor: Esko Juvonen, Lahti (FI)

(73) Assignee: Sandvik Mining and Construction Oy, Tampere (FI)

( * ) Notice: Subject to any disclaimer, the term of this patent is extended or adjusted under 35 U.S.C. 154(b) by 322 days.

(21) Appl. No.: 12/285,433

(22) Filed: Oct. 3, 2008

(65) Prior Publication Data
US 2009/0090525 A1    Apr. 9, 2009

(30) Foreign Application Priority Data

Oct. 5, 2007    (FI) .................................. 20075704

(51) Int. Cl.
*E21B 7/24*    (2006.01)
*F16K 21/16*    (2006.01)

(52) U.S. Cl. ........... 173/1; 173/13; 173/14; 137/625.25; 137/625.34; 137/625.35

(58) Field of Classification Search ................ 173/1, 13, 173/14, 93, 136, 137, 206; 137/625.25, 625.34, 137/625.35, 625.65, 625.69, 494, 495, 498; 251/50, 53

See application file for complete search history.

(56) References Cited

U.S. PATENT DOCUMENTS

| | | | | |
|---|---|---|---|---|
| 3,774,502 A * | 11/1973 | Arndt | ............................. | 91/246 |
| 3,845,693 A * | 11/1974 | Meyers | .......................... | 91/371 |
| 3,847,322 A * | 11/1974 | Smith | ............................ | 227/132 |
| 3,985,472 A * | 10/1976 | Virtue et al. | ................... | 417/216 |
| 4,020,744 A * | 5/1977 | Swenson | ...................... | 91/216 B |
| 4,062,411 A * | 12/1977 | Adkins et al. | ................. | 173/115 |
| 4,082,032 A * | 4/1978 | Swenson | ...................... | 91/216 B |
| 4,122,868 A * | 10/1978 | Holloway et al. | ......... | 137/625.69 |
| 4,133,511 A * | 1/1979 | Hartmann et al. | ........ | 251/129.11 |
| 4,251,114 A * | 2/1981 | Belart | .......................... | 303/9.61 |
| 4,342,255 A * | 8/1982 | Watanabe et al. | ................. | 91/40 |
| 4,460,051 A * | 7/1984 | Widmer | ......................... | 173/208 |
| 4,466,597 A * | 8/1984 | Vanderlaan | .............. | 251/129.03 |
| 4,474,248 A * | 10/1984 | Musso | ............................. | 173/17 |
| 4,653,814 A * | 3/1987 | Burgdorf | ......................... | 303/52 |
| 4,878,550 A * | 11/1989 | Chuang | ............................ | 175/296 |
| 4,899,836 A * | 2/1990 | Vernot | ............................ | 173/207 |
| 5,117,921 A * | 6/1992 | Bartels et al. | ..................... | 173/13 |
| 5,174,387 A * | 12/1992 | Arndt et al. | ........................ | 173/1 |

(Continued)

FOREIGN PATENT DOCUMENTS

EP    1 496 295    1/2005

*Primary Examiner* — Rinaldi Rada
*Assistant Examiner* — Gloria R Weeks
(74) *Attorney, Agent, or Firm* — Morgan, Lewis & Bockius LLP (57) ABSTRACT

A hydraulic rock breaking device, a protection valve and a method of operating a hydraulic rock breaking device. The rock breaking device comprises a percussion device to which pressure fluid is fed along an inlet channel. The inlet channel is provided with a protection valve arranged to monitor the volume flow of pressure fluid flowing through it. If the flow is larger than what has been preset, the protection valve closes, at least partly, the connection through it, protecting thus the percussion device against too high an input power. The protection valve comprises a throttle which generates a pressure difference the magnitude of which is dependent on the fed volume flow. Information on the pressure difference is utilized in controlling the protection valve.

19 Claims, 4 Drawing Sheets

U.S. PATENT DOCUMENTS

| | | | |
|---|---|---|---|
| 5,408,768 A * | 4/1995 | Karani | 37/466 |
| 5,526,885 A * | 6/1996 | Kuvshinov et al. | 173/17 |
| 5,529,132 A * | 6/1996 | Evarts | 173/1 |
| 5,890,548 A * | 4/1999 | Juvonen | 173/208 |
| 6,029,753 A * | 2/2000 | Kuusento et al. | 173/1 |
| 6,073,706 A * | 6/2000 | Niemi | 173/206 |
| 6,742,503 B2 * | 6/2004 | Feucht | 123/446 |
| 6,994,175 B2 * | 2/2006 | Egerstrom | 175/296 |
| 7,124,578 B2 * | 10/2006 | Noel | 60/468 |
| 7,464,635 B2 * | 12/2008 | Rantala et al. | 91/193 |

* cited by examiner

Prior Art

ROCK BREAKING DEVICE, PROTECTION VALVE AND A METHOD OF OPERATING A ROCK BREAKING DEVICE

RELATED APPLICATION DATA

This application claims priority under 35 U.S.C. §119 and/or §365 to Finnish Application No. 20075704, filed Oct. 5, 2007, the entire contents of which are incorporated herein by reference.

BACKGROUND OF THE INVENTION

The invention relates to a hydraulic rock breaking device provided with a percussion device. With the percussion device, impact pulses can be given to a tool connected to the rock breaking device, the tool further transmitting the impact pulses to the material to be broken. Further, the invention relates to a protection valve arrangeable in the inlet channel of a hydraulic percussion device being part of a rock breaking device. Further still, the invention relates to a method of operating such a rock breaking device.

The objects of the invention are defined in greater detail in the preambles of the independent claims of the application.

A breaking hammer is used as an auxiliary device of an excavator or another work machine when the intention is to break for instance rock, concrete or other relatively hard material. The breaking hammer comprises an percussion device with which impacts can be given to a tool attached to the breaking hammer, the tool further transmitting the impacts to the material to be broken. The percussion device is usually hydraulic and comprises a percussion piston having, due to the effect of hydraulic pressure, reciprocal movement and striking the impact surface at the upper end of the tool. At the same time as impacts are given with the percussion piston, the tool is pressed against the material to be broken, whereby the tool penetrates into the material to be broken due to the effect of the impact and the pressing, causing breaking of the material.

Hydraulic breaking hammers are typically connected to a work machine as an auxiliary device. Modern excavators have a computer-controlled control unit which allows the volume flow and the operating pressure fed to each auxiliary device connected to the excavator to be controlled. The operator can easily select the correct settings for each auxiliary device by means of the control unit. It is possible, however, that the operator erroneously selects the incorrect settings for the breaking hammer, in which case the breaking hammer may be operated in such a way that too large a volume flow or too high a pressure have been fed in, i.e. with an excessively high input power. Feeding too high a power to the breaking hammer may cause the hammer to break or wear out prematurely. Feeding incorrect power to the breaking hammer may be a mistake but it has also been observed that some operators select incorrect settings for the breaking hammer in purpose with the intention of improving the output power of the breaking hammer by means of the excessively high input power. In such a case, however, the improvement in the power is achieved at the cost of the durability of the device, which is naturally not acceptable. Thus, the problem is that for some reason or other, an excessively high input power can be fed to the breaking device.

BRIEF DESCRIPTION OF THE INVENTION

An object of this invention is to provide a novel and improved rock breaking device and protection valve as well as a novel and improved method of operating a rock breaking device.

The rock breaking device according to the invention is characterized in that at least one protection valve is arranged in the inlet channel; that the protection valve comprises: a body; at least one inlet opening for feeding hydraulic fluid to the protection valve; at least one outlet opening for feeding hydraulic fluid from the protection valve to the inlet channel; a spool arranged to move in the inlet direction of the flow and in the reverse direction of the flow; and at least one force member for moving the spool towards the inlet direction; that the spool of the protection valve has three predetermined axial coupling points; that the spool is arranged to become positioned at the first coupling point by the effect of the force member in a situation where the inlet opening is provided with pressure lower than a predetermined pressure, whereby the protection valve is arranged to prevent at the first coupling point the flow of the pressure fluid in the reverse direction; that the spool is arranged to become positioned at the second coupling point in a situation where a flow smaller than a predetermined maximum volume flow is led through the protection valve in the inlet direction, whereby the protection valve is arranged at the second coupling point to allow a pressure fluid flow through it; and that the spool is arranged to become positioned at the third coupling point in a situation where a flow larger than a predetermined maximum volume flow is led through the protection valve in the inlet direction, whereby the protection valve is arranged at the third coupling point to prevent, at least partly, a pressure fluid flow through it.

The protection valve according to the invention is characterized in that the spool comprises at least one first control pressure surface in continuous connection with the pressure in the inlet opening and arranged to influence the spool in the reverse direction; that the spool comprises at least one second control pressure surface in continuous connection with the pressure in the outlet opening and arranged to influence the spool in the inlet direction; that the outlet opening is provided with at least one throttle to provide a pressure difference between the inlet opening and the outlet opening, the magnitude of the pressure difference being dependent on the magnitude of the fed volume flow; that the magnitude of the resultant force of the first control pressure surface and the second control pressure surface in the reverse direction is dependent on said pressure difference; that the axial position of the spool is arranged to be determined on the basis of the mutual relation of said resultant force and the force provided by a force member; that the spool of the protection valve has three predetermined axial coupling points; that at the first coupling point a first collar of the spool is arranged to prevent a pressure fluid flow from the inlet opening to the outlet opening; that at the second coupling point there is an open connection from the inlet opening to the outlet opening when the resultant force and the force provided by the force member, influencing the spool, are in balance; and that at the third coupling point a second collar of the spool is arranged to prevent, at least partly, a pressure fluid flow from the inlet opening to the outlet opening when the resultant force influencing the spool is greater than the force provided by the force member.

The method according to the invention is characterized by leading the pressure fluid flowing to the percussion device through at least one protection valve in the inlet direction; monitoring the volume flow of the pressure fluid fed to the percussion device by means of said protection valve; and preventing, at least partly, a pressure fluid flow through the protection valve if the volume flow fed to the percussion device exceeds a preset maximum volume flow determined by the protection valve.

The idea of the invention is that feeding of an oversize volume flow to the percussion device of a rock breaking device is prevented by means of at least one protection valve. The protection valve is arranged in the inlet channel of the percussion device. The protection valve comprises one or more throttles, whereby a pressure difference is generated between the inlet opening and the outlet opening of the protection valve, the magnitude of the pressure difference depending on the magnitude of the fed flow volume. On the basis of the pressure difference, the spool of the protection valve or the like control member is guided axially between its coupling points.

An advantage of the invention is that a rock breaking device, i.e. a breaking hammer or rock drilling machine, can be protected by means of a protection valve against too high an input power, whereby breaking and premature wearing of the percussion device caused by the use of an excessively high power can be avoided. Thus, the rock breaking device can be used efficiently for the whole service life planned for it, and extra repair and maintenance as well as consequent interruptions in the operation can be avoided. Further, the invention makes it possible to avoid guarantee disputes, difficult to settle afterwards, because now the manufacturer can restrict the maximum input power by means of the protection valve, owing to which the percussion device cannot be operated with too high an input power in purpose or by mistake. Furthermore, too high an input power is avoided in a case where one of the control components or the control unit of the work machine has a failure so that the system feeds too high an input power. The protection valve according to the invention is relatively simple to arrange in the inlet channel of both a new percussion device and one already in use. Further still, the protection valve according to the invention facilitates control of hydraulic set values in the control unit of the work machine.

The idea of an embodiment is that the protection valve is provided with one or more bypass channels. When the protection valve has triggered to a closed coupling position due to too great a pressure difference, a pressure fluid flow smaller than a normal volume flow may flow in the inlet direction through the bypass channel. Thus, a smaller volume flow flows through the protection valve, whereby the impact frequency of the percussion device is lower than normally. The operator of the device notices the decreased impact frequency and resets the volume flow to be fed. In cold conditions, the pressure difference may grow due to the higher viscosity of the pressure fluid. When a smaller volume flow of pressure fluid is led through the bypass channel, the pressure fluid heats up, and thus the percussion device can also be heated to the normal operating temperature.

The idea of an embodiment is that the protection valve is provided with at least one relief valve. The relief valve is arranged to open when the feed pressure is higher than the set pressure limit. The opening of the relief valve is arranged to influence the forces influencing the spool of the protection valve in such a way that the spool is arranged to move into the closed coupling position as soon as the pressure limit is exceeded. Thus, the operation of the percussion device stops, or at least the impact frequency of the device is reduced. This is an indication to the operator to check the set values of the pressure fluid to be fed to the percussion device.

BRIEF DESCRIPTION OF THE FIGURES

Some embodiments of the invention will now be described in greater detail with reference to the attached drawings, in which.

For the sake of clarity, embodiments of the invention are shown simplified in the figures. Similar parts have been denoted with the same reference numerals.

DETAILED DESCRIPTION OF THE INVENTION

Figure 1:
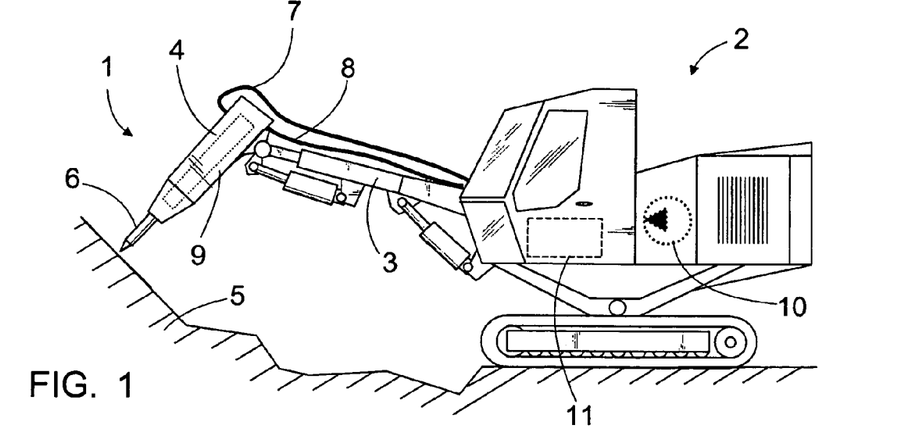
FIG. 1 shows schematically a breaking hammer arranged as an auxiliary device in an excavator.

In FIG. 1, a breaking hammer 1 is arranged at the free end of a boom 3 of a work machine 2, such as an excavator. Alternatively, the breaking hammer 1 may be arranged in any movable work machine 2 or, for instance, on a boom mounted on a fixed base. The breaking hammer 1 comprises a percussion device 4 with which impact pulses can be generated. The breaking hammer 1 is pressed by means of the boom 3 against material 5 to be broken at the same time as impacts are given to a tool 6 connected to the breaking hammer 1 by the percussion device 4, the tool 6 transmitting the impacts to the material 5 to be broken. The percussion device 4 may be hydraulic, in which case it is connected to the hydraulic system of the work machine 2 by means of at least one inlet channel 7 and at least one outlet channel 8. The impact pulses may be generated by means of an impact element reciprocally movable in the percussion device 4, as described in FIGS. 2 and 3, or alternatively in any other way. Further, the breaking hammer 1 may comprise a protective casing 9, inside which the percussion device 4 may be arranged to be protected against damages and impurities. The tool 6 is led through the lower part of the protective casing 9.

The work machine 2 comprises one or more hydraulic pumps 10 which generate hydraulic pressure for operating the work machine 2 and auxiliary devices attached to it. The work machine 2 may comprise one or more control units 11 arranged to control the hydraulic pressure and flow to be fed to the auxiliary devices. The control unit 11 may be arranged to control control components which are arranged in the hydraulic circuit and by means of which the hydraulic power to be led from the pump to each of the auxiliary devices, i.e. the hydraulic pressure and flow, can be influenced. The control unit 11 may comprise a computer, a programmable logic or the like in which the set values for the hydraulic fluid feed for the auxiliary devices to be attached to the work machine can be stored. Further, the control unit 11 may comprise a control strategy in accordance to which it controls the control components in the hydraulic circuit. The operator may load the set values from a memory means or, alternatively, feed the set values manually to the control unit 11 and store them in a memory.

Figure 2:
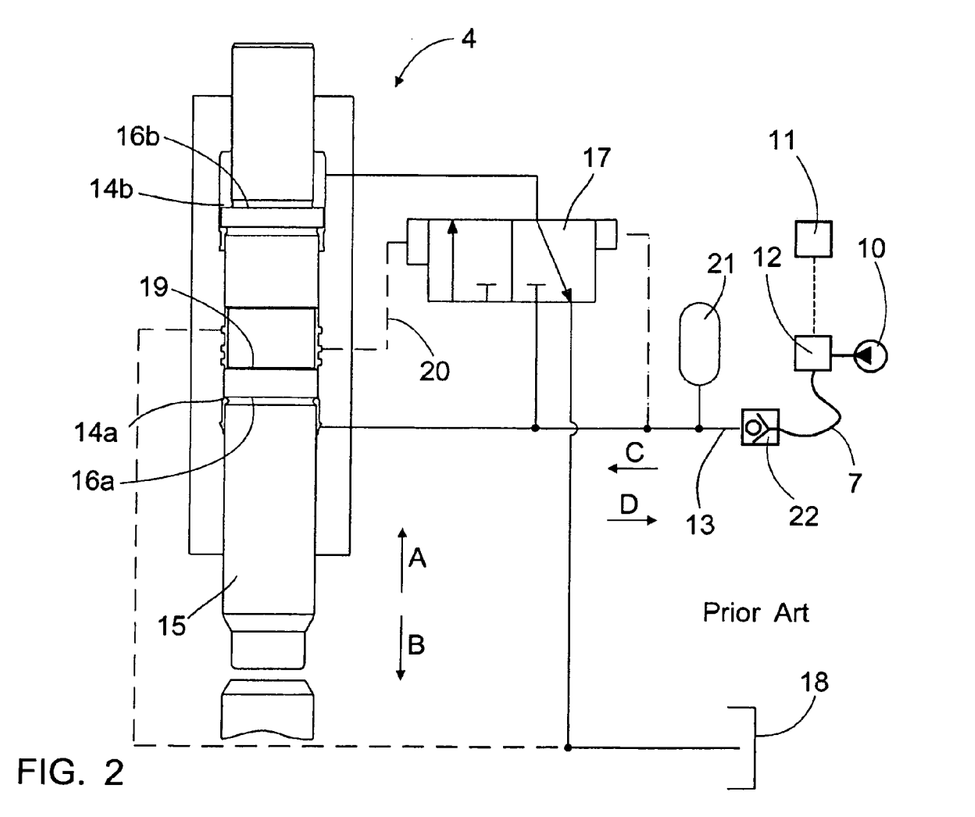
FIG. 2 shows schematically an arrangement and a hydraulic circuit according to prior art for operating a percussion device.

FIG. 2 shows a hydraulic system according to prior art. The pump 10 generates hydraulic pressure, which is led via control components 12 controlled by the control unit 11 along hoses or corresponding channels to an inlet channel 13 in the percussion device 4, the inlet channel leading the hydraulic fluid to a first operating pressure space 14a and a second operating pressure space 14b of the percussion device 4. When the percussion device is being operated, continuous hydraulic pressure is led to the first operating pressure space 14a, whereby a first working pressure surface 16a of an impact element 15 is continuously influenced by a force that tends to move the impact element 15 towards the return direction A. The operating cycle of the percussion device 4 is controlled by means of a control valve 17, which may be pressure-controlled, as shown in the figure, in which case the percussion device 4 gives impact pulses to the tool 6 as long as the inlet channel 13 is influenced by hydraulic pressure. In the case of FIG. 2, the control valve 17 is shown in its left-hand position, whereby it allows the hydraulic fluid to flow from the second operating pressure space 14b to a tank 18, whereby no force influencing towards the impact direction B is directed at a second operating pressure surface 16b of the impact element but the impact element 15 moves towards the return direction A. Once the impact element 15 moves towards the return direction A, a connection is opened from the first operating pressure space 14a along a control channel 20 to the control valve 17, which moves to its right-hand position and allows the hydraulic pressure to flow from the inlet channel 13 to the second operating pressure space 14b, whereby the hydraulic pressure influencing the second operating pressure surface 16b pushes the impact element 15 towards the impact direction B. In order for this to take place, the area of the second operating pressure surface 16b must be larger than that of the first operating pressure surface 16a.

Typically, the hydraulic circuit also comprises one or more pressure accumulators 21, in which hydraulic energy can be stored to provide the impact movement of the impact element 15. That is to say, a large volume flow of hydraulic fluid is needed during the impact movement, and a sufficient amount of hydraulic fluid during acceleration is not received from the pump 10 alone. Thus, the pressure accumulator 21 evens out variations of pressure and flows in the hydraulic system. The movement of the impact element 15 towards the return direction A, in contrast, is considerably slower, whereby hydraulic energy can be stored in the pressure accumulator 21 during the return movement.

Further, FIG. 2 shows that the inlet channel 13 may comprise a non-return valve 22, which prevents the flow of hydraulic fluid back towards the pump 10 in direction D opposite to the inlet direction C when the percussion device 4 is stopped. Thus, the hydraulic energy charged in the pressure accumulator 21 is not discharged, owing to which the percussion device 4 can be quickly restarted after a stop. The non-return valve 22 reopens when a flow is led from the pump 10 towards the percussion device 4 in the normal inlet direction C.

Figure 3:
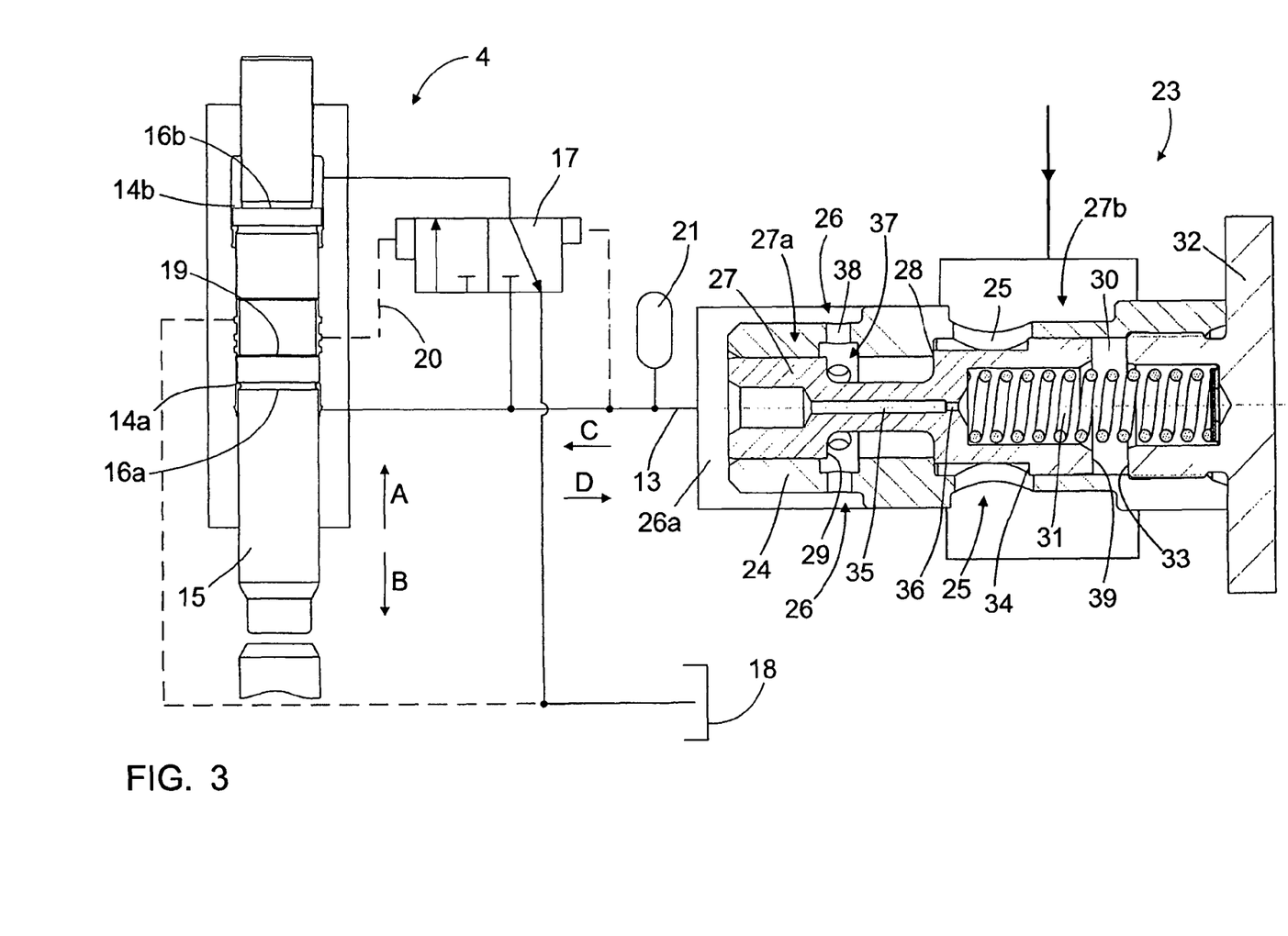
FIG. 3 shows schematically an arrangement and a hydraulic circuit according to the invention for operating a percussion device.

FIG. 3 shows a hydraulic system according to the invention corresponding to that shown in FIG. 2 with the exception that here the non-return valve 22 has been replaced with a new kind of a protection valve 23. The protection valve 23 may include a built-in non-return valve function but its operation deviates from the operation of an ordinary non-return valve, described above with reference to FIG. 2. That is to say, the protection valve 23 opens when its spool 27 is moving against a spring 31 in the reverse direction D of the inlet flow and closes, moved by the spring 31, when the inlet flow stops. Between the extreme positions of the spool 27, there is a balance position in which the protection valve 23 allows a flow through it.

The protection valve 23 may be arranged in a space formed in the body of the percussion device 4. The body 24 of the protection valve 23 may comprise one or more inlet openings 25 and one or more outlet openings 26. Similarly to FIG. 2, the hydraulic pressure generated by the hydraulic pump 10 is led via the control components 12 controlled by the control unit 11 to an inlet opening 25. An outlet opening 26 is connected to the inlet channel 13. Further, the protection valve 23 comprises a spool 27 which has a first end 27a and a second end 27b and is movable in the inlet flow direction C, i.e. inlet direction, and in the reverse flow direction D, i.e. reverse direction. The spool 27 comprises a first collar 28 or the like closing surface that may close the inlet opening 25, as shown in FIG. 3. The movement of the spool 27 towards the inlet direction C may be limited by means of the first collar 28 and a limiting surface formed in the body 24. When the spool 27 is moving from its position shown in FIG. 3 towards the reverse direction D, a connection opens between the inlet opening 25 and the outlet opening 26. If the spool 27 moves over its middle position into its right-hand extreme position shown in FIG. 5, a second collar 29 in the spool 27 or the like closing surface closes the outlet opening 26. On the side of the second end 27b of the spool, there is a spring space 30 provided with one or more force members, such as a spring element 31, typically a spiral spring, which tends to push the spool 27 continuously in the flow inlet direction C. The spring space 30 may further comprise a cover piece 32, in connection of which there may be a limiting surface 33 limiting the movement of the spool 27 in the reverse direction D. Thus, the protection valve 23 has three coupling points, depending on the axial position of the spool 27. When the spool 27 is in its extreme axial positions, i.e. at the first and the third coupling points, the protection valve 23 influences the flow of hydraulic fluid. When the spool 27 is in the balance position, i.e. in the middle position between the axial extreme positions, the protection valve 23 allows a flow through it.

It is also seen from FIG. 3 that the spool 27 comprises a first control pressure surface 34 that is in continuous connection to the inlet opening 25. Thus, the pressure in the inlet opening 25 tends to continuously push the spool 27 against the spring element 31, i.e. in the reverse direction D. Further, the spool 27 comprises one or more connecting channels 35 along which the inlet channel 13 is in connection with the spring space 30. In practice, an outlet space 26a has been formed on the front side of the protection valve 23 in the body of percussion device 4, the outlet space being connected to the spring space 30 by means of a connecting channel 35 going through the spool 27. In connection with the connecting channel 35, there may be one or more throttles 36 which generate a pressure difference between the spring space 30 and the outlet space 26a, depending on the velocity of movement of the spool 27. Further, the throttle 36 may attenuate the pressure changes between the spring space 30 and the outlet space 26a. Alternatively, the connecting channel 35 and the throttle 36 may be formed in the body of the percussion device 4.

In the following, the operation of the protection valve 23 of FIG. 3 is shown. When hydraulic fluid is being led to the inlet opening 25, its pressure influences the first control pressure surface 34, whereby the spool 27 is subjected to a force pushing the spool 27 from the position shown in FIG. 3 towards the reverse direction D. When the force generated on the control pressure surface 34 is greater than a resultant force generated by the forces of the spring element 31 and a second control pressure surface 39, the spool 27 moves towards the reverse direction D and opens the inlet channel 25. Thus, the pressure fluid can flow from the inlet opening 25 to the outlet opening 26 and further via the outlet space 26a to the inlet channel 13. The outlet opening 26 is dimensioned in such a way that the flow through it with a preselected maximum volume flow generates a preselected pressure difference between the pressures in the inlet opening 25 and in the inlet channel 13. Due to this pressure difference, the force generated by the control pressure surface 34 keeps the spool 27 in the middle second coupling point. At the middle coupling point, both the inlet opening 25 and the outlet opening 26 are open. If a volume flow larger than the predefined maximum volume flow is led to the inlet opening 25, a greater pressure difference is generated due to the effect of the throttle of the outlet opening 26 between the inlet opening 25 and the outlet opening 26. As a result, the force generated by the control pressure surface 34 is capable of pushing the spool 27 by a greater distance towards direction D against the spring force. Thus, the spool 27 moves to the third coupling point shown in FIG. 5, whereby the second collar 29 suddenly closes the outlet opening 26. When the spool 27 is moving towards the third coupling point, the size of the flow opening is simultaneously reduced at the closing point 37 of the outlet opening 26. Before the spool 27 reaches its extreme position in the reverse direction D, a critical position is formed in which the size of the flow opening 37 of the closing point is smaller than the size of the flow opening of a throttle 38 of the outlet opening. Thus, the pressure difference between the inlet opening 25 and the outlet opening 26 is further increased after this critical position. Correspondingly, a pressure difference is generated between the inlet opening 25 and the spring space 30 because the spring space 30 is in connection with the outlet space 36 by means of the connecting channel 35. Due to this, the force influencing the second control pressure surface 39 at the second end 27b of the spool is reduced in relation to the first control pressure surface 34. Once the spool 27 has reached this critical position, the closing point 37 is inevitably and quickly closed. Thus, the protection valve 23 has caused, in a desired manner, the percussion device 4 to stop in a situation where an over-size volume flow larger than the predefined maximum volume flow has been fed to it. Stopping of the percussion device 4 is a clear indication to the operator that the percussion device 4 has been used with incorrect values.

After having been stopped by the protection valve 23, the percussion device 4 can be restarted by switching off the volume flow fed to the inlet opening 25, i.e. in practice by closing the valve of the percussion device circuit or the like control component 12. When the volume flow has been switched off, the pressure difference between the control pressure surfaces 34, 39 is reduced, which results in the spring member 31 pushing the spool 27 into its extreme position in direction C, i.e. to the first coupling point shown in FIG. 3.

Figure 4:
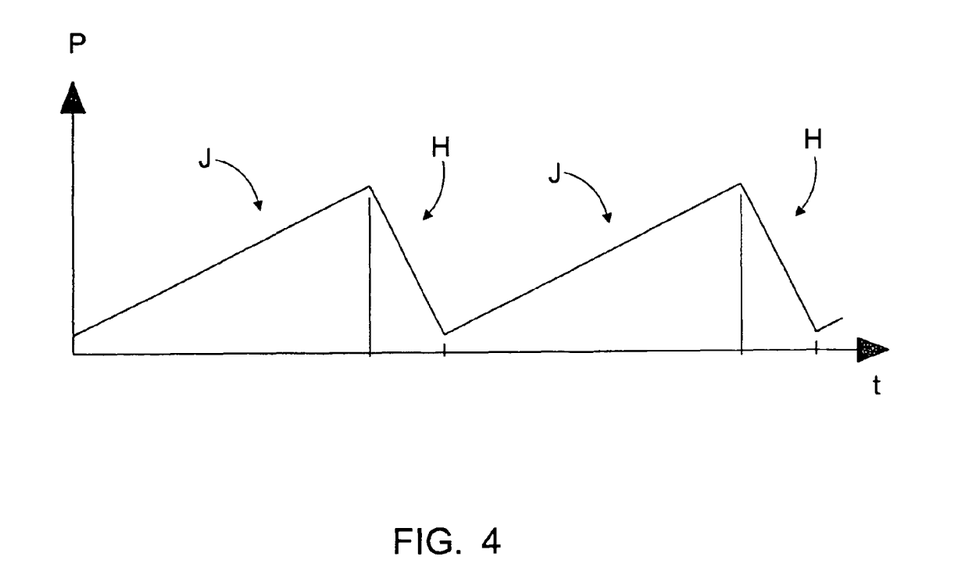
FIG. 4 shows schematically and as a function of time the pressure pulsation of the hydraulic circuit, resulting from the operating cycle of the percussion device.

The throttle 36 in the connecting channel 35 is dimensioned in such a way that it is capable of attenuating pressure changes between the spring space 30 and the outlet space 26a, resulting from the ordinary operating cycle of the percussion device 4. As seen from FIG. 4, pressure P in the outlet space 26a is reduced during the impact movement H of the impact element 15 because here a large volume flow of pressure fluid is needed quickly. In contrast, the return movement J of the impact element 15 and an increase in pressure P take place more slowly in the percussion device 4 of FIG. 3, due to which the return movement J does not cause a sudden pressure change that would have a detrimental effect on the operation of the protection valve 23. Naturally, the operation principle of the percussion device 4 may also be different, in which case the throttle 36 may also attenuate the pressure changes caused by the return movement. The throttle 36 is dimensioned in such a way that the pressure prevailing in the spring space 30 does not have time to decrease so much during the impact movement that the force influencing the second control pressure surface 39 would decrease in relation to the first control pressure surface 34, as a result of which the spool would move in the reverse direction D and cause the protection valve 23 to trigger to the closed coupling point. Thus, by means of the throttle 36, the triggering of the protection valve 23 due to the pressure changes resulting from the ordinary operating cycle of the percussion device 4 can be prevented when an allowed volume flow is used.

Figure 5:
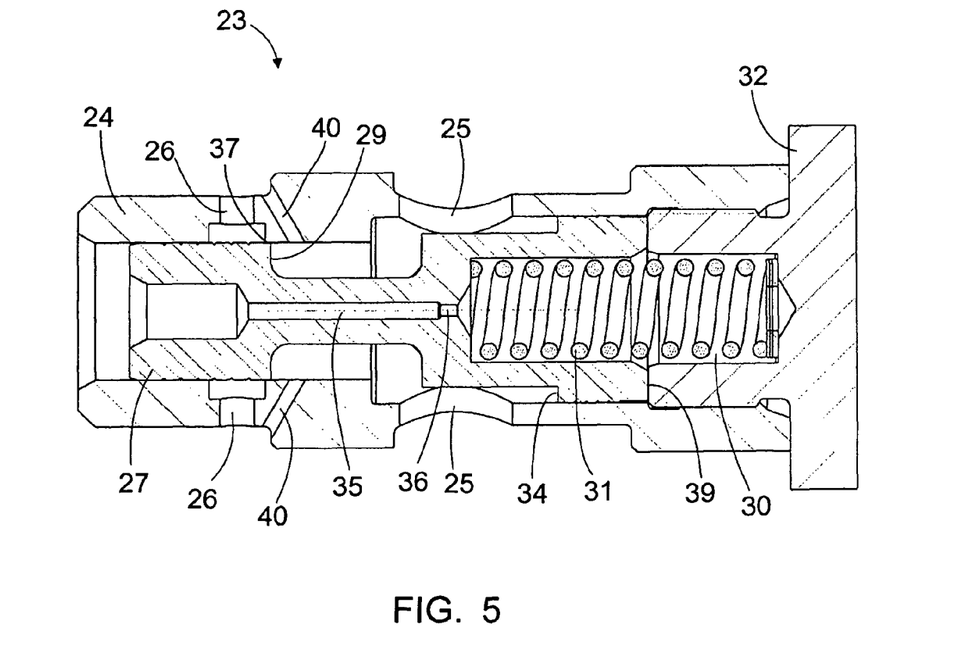
FIG. 5 shows schematically a cut-out of a protection valve according to the invention.

The protection valve 23 of FIG. 5 is similar to that of FIG. 3 with the exception that it comprises one or more bypass channels 40, through which a small volume flow can flow even if the second collar 29 closed the whole closing point 37. Thus, when an oversize volume flow larger than the predefined maximum volume flow has been fed to the protection valve 23 and the spool 27 has moved to the third coupling point shown in the figure, a volume flow smaller than normally can flow to the percussion device 4. In this case, the percussion device 4 does not stop completely but continues operation at a lower impact frequency. The impact energy of individual impacts is not essentially reduced. The bypass channel 40 is dimensioned in such a way that the impact frequency is considerably reduced, whereby the operator is certain to notice the difference compared with the normal operation and to set the correct set values for the input power.

The protection valve 23 provided with bypass channels 40 shown in FIG. 5 can be utilized for heating the percussion device 4 to the operating temperature. As is known, the viscosity of hydraulic fluids is considerably higher in cold conditions. The higher viscosity of hydraulic fluid causes a greater pressure difference in the outlet opening 26. A pressure difference that is greater compared with the normal operating temperature causes the spool 27 to move to the third coupling point according to FIG. 5 even if the volume flow used did not exceed the predefined maximum volume flow. When only a volume flow smaller than normally gets to flow through the bypass channel 40, the pressure increases in the pressure channels leading to the protection valve 23, as a result of which the hydraulic fluid heats up due to the effect of the losses. In this way, the protection valve 23 can be utilized for heating hydraulic fluid and, through that, the percussion device 4. During the heating, the percussion device 4 operates at a lower impact frequency, whereby the risk of the device getting damaged is small. When the pressure fluid heats up, its viscosity is reduced, and consequently the pressure difference between the inlet opening 25 and the outlet opening 26 is reduced. Thus, the spring member 31 pushes the spool 27 to the middle coupling point, where the pressure fluid can flow freely through the protection valve 23.

Figure 6:
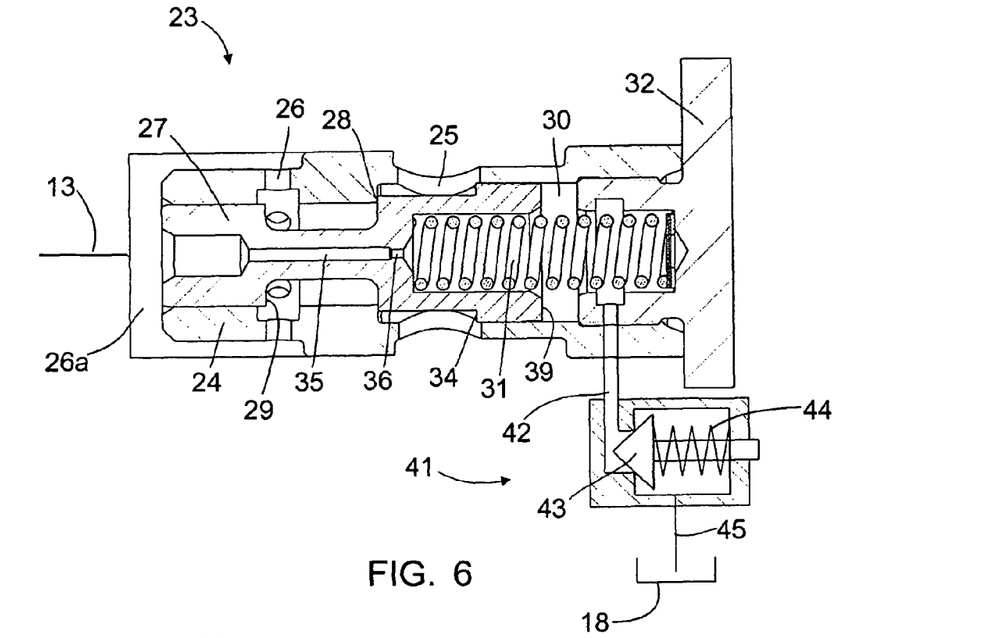
FIG. 6 shows schematically a cut-out of an alternative protection valve according to the invention, further provided with a pilot valve protecting the percussion device against too high an operating pressure.

FIG. 6 shows a protection valve similar to the one in FIG. 3, further provided with a relief valve 41. In this case, the basic construction of the protection valve 23 protects the percussion device 4 against an oversize volume flow, as described above, and additionally the relief valve 41 protects the percussion device 4 against too high an operating pressure. The relief valve 41 is connected to the spring space 30 by means of a channel 42. The relief valve 41 comprises a pilot spool 43, which is pressed towards the closed, normal operating position by means of a spring 44. The pressure in the spring space 30 tends to open the pilot spool 43 to a channel 45 leading to the tank 18. If a pressure higher than the predefined pressure is led to the percussion device 4 through the protection valve 23, the excessively high pressure influences the spring space 30 from the outlet space 26a along the connecting channel 35, and further the spool 43 of the relief valve 41 along the channel 42, and pushes the spool 43 open, as a result of which the excess pressure is discharged into the tank. Thus, the force directed at the second control pressure surface 39 is reduced and the spool 27 of the protection valve moves to the third coupling point, whereby the second collar 29 closes the connection to the outlet opening 26. Thus, this takes place although the predefined maximum volume flow has not been exceeded.

Figure 7:
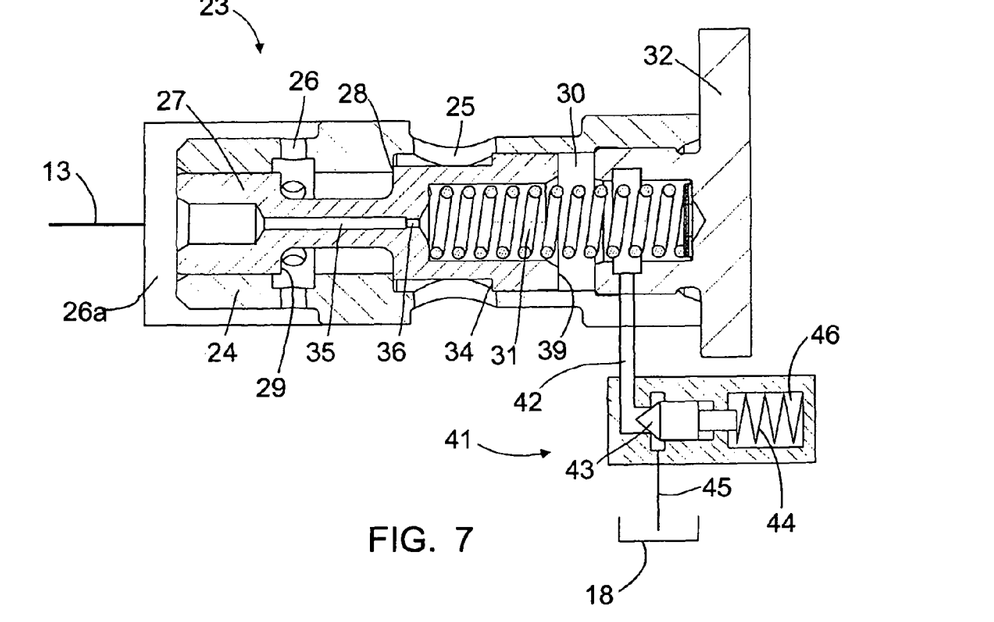
FIG. 7 shows schematically a cut-out of a variation of the protection valve according to FIG. 6.

FIG. 7 shows an embodiment of the relief valve 41 shown in FIG. 6. In the relief valve 41 according to FIG. 6, the pilot spool 43 is subjected, in the direction of movement of the spring 44, to the pressure of a tank channel 45, which is typically around zero. If the pressure of the tank channel 45 is higher due to a failure or some other reason, the relief valve 41 shown in FIG. 6 does not necessarily protect the percussion device 4 against too high an operating pressure. Thus, FIG. 7 presents a solution where it is only the spring 44 that influences the pilot spool 43 towards the closed position because one end of the pilot spool 43 is in a spring space 46, which is in connection with atmospheric air. This solution protects the percussion device 4 against the use of excessively high pressure, irrespective of the pressure of the tank channel 45.

When the percussion device is used in cold conditions, the viscosity of the pressure fluid is high. Thus, the pressure difference in the protection valve 23 increases and the spool 27 moves to the right-hand third coupling point. When the spool 23 closes the connection through the protection valve 23, the pressure increases in the inlet opening 25. Then, the relief valve 41 opens a connection to the tank 18. When being led through the narrow channels of the relief valve 41, the pressure fluid may heat up as a result of the losses generated. Thus, the relief valve 41 may be utilized in heating the pressure fluid. When the pressure fluid heats up, the viscosity is simultaneously reduced, and consequently the pressure difference in the protection valve 23 is reduced and the spool 27 reopens the connection through the valve. As a result, the pressure is reduced and the relief valve 41 can close.

It is to be noted that the protection valve 23 can also be implemented deviating from the above embodiments. For example, it is feasible to use another force member as the spring member 31, with which the spool 27 can be moved with a predetermined force towards the inlet direction C of the main flow. The force member may be, instead of a mechanical spring, for instance an actuator operated by pressure medium, such as bellows, or it may be an electrical actuator in some cases. Further, the inlet opening 25, the outlet opening 26 and the collars 28, 29 can be positioned and shaped also in a different manner than what is shown in the figures. The number of openings and collars can also be selected according to the need. The collars 28, 29 do not necessarily have to be as shown in the figures, i.e. closing surfaces substantially perpendicular to the mid-axis of the spool 27, but the collars may comprise a slanting surface and form an angle of 45°, for example, relative to the mid-axis of the spool 27. Further, it is feasible to form the bypass channels 40 shown in FIG. 5 in another way. The bypass channels 40 do not necessarily have to be separate channels but they may be grooves at the edge of the outlet opening 26, along which grooves a flow smaller than normally can flow through although the spool 27 of the protection valve 23 is in the third coupling point. Alternatively, one or more separate bypass channels 40 may be formed in the spool 27, or the second collar 29 may be provided with one or more grooves or the like, along which a volume flow smaller than normally gets through.

Further, it is feasible to arrange a non-return valve function by using a separate non-return valve, similarly to what is shown in FIG. 2, for example. In such a case, the protection valve 23 does not have to prevent a flow in the reverse direction D when the percussion device 4 has been stopped. Further, the relief valve 41 may be arranged as a component separate from the protection valve 23. Thus, in some cases, the protection valve 23 may be constructed in such a way that it monitors only the volume flow fed through it. Such a protection valve 23 comprises a throttle generating a pressure difference which is dependent on the magnitude of the volume flow and with which a control member of the protection valve, such as a spool, is moved in such a way that the flow is prevented either completely or at least partly if the fed volume flow exceeds the predefined volume flow.

The description of FIGS. 2 and 3 presents a percussion device 4 in which the first operating pressure surface 16*a* of the impact element 15 is subjected, during the operating cycle, to continuous hydraulic pressure, and the hydraulic pressure influencing the second operating pressure surface 16*b* is varied to generate reciprocal movement of the impact element 15. However, the protection valve 23 according to the invention can also be applied to protecting other kinds of hydraulic percussion devices 4. The percussion device 4 may be such, for example, that the pressure influencing its operating pressure surfaces 16*a*, 16*b*, which influence in opposite directions, is varied. Further, the percussion device 4 may be such that it has no reciprocally moving impact element 15 but impact energy may be first charged and then abruptly discharged, whereby an impact pulse is generated. Also these kinds of percussion devices 4 can be protected with the arrangement according to the invention.

A corresponding problem with feeding of too high an input power to the percussion device may occur not only in a breaking hammer but also in a rock drilling machine. A rock drilling machine comprises a percussion device with which impact pulses are given directly to a tool or to a drill shank to which the tool is attached. Further, a rock drilling machine may comprise a rotating device with which the tool can be turned around its longitudinal axis. Further, a rock-drilling device may comprise a flushing device with which flushing agent can be fed along the tool to a hole to be drilled to remove chippings. The protection valve may be arranged in the inlet channel of a percussion device in the same way as in a breaking hammer.

In some cases, features described in this application may be used as such, irrespective of other features. On the other hand, features described in this application may, if required, be combined to form various combinations.

The drawings and the related specification are only intended to illustrate the idea of the invention. Details of the invention may vary within the scope of the claims.

What is claimed is:

1. A hydraulic rock breaking device comprising:
a percussion device arranged to generate impact pulses in a tool connected to the rock breaking device;
an inlet channel along which hydraulic fluid is feedable to the percussion device in the inlet direction of the flow;
at least one protection valve arranged in the inlet channel, the protection valve comprising: a body; at least one inlet opening for feeding hydraulic fluid to the protection valve; at least one outlet opening for feeding hydraulic fluid from the protection valve to the inlet channel; a spool arranged to move in the inlet direction of the flow and in the reverse direction of the flow; and at least one force member for moving the spool towards the inlet direction,
and wherein the spool of the protection valve has three predetermined axial coupling points,
the spool is arranged to become positioned at the first coupling point by the effect of the force member in a situation where the inlet opening is provided with pressure lower than a predetermined pressure, whereby the protection valve is arranged to prevent at the first coupling point the flow of the pressure fluid in the reverse direction, the spool is arranged to become positioned at the second coupling point in a situation where a flow smaller than a predetermined maximum volume flow is led through the protection valve in the inlet direction, whereby the protection valve is arranged at the second coupling point to allow a pressure fluid flow through the protection valve, and the spool is arranged to become positioned at the third coupling point in a situation where a flow larger than a predetermined maximum volume flow is led through the protection valve in the inlet direction, whereby the protection valve is arranged at the third coupling point to prevent, at least partly, pressure fluid flow through the protection valve.

2. A rock breaking device according to claim 1, wherein the protection valve is provided with at least one bypass channel through which a flow of pressure fluid smaller than a normal volume flow is arranged to be led in the inlet direction when the spool is at the third coupling point, whereby, due to the smaller volume flow, the impact frequency of the percussion device is lower than normally.

3. A rock breaking device according to claim 1, wherein the spool comprises at least one first control pressure surface which is in continuous connection with the pressure prevailing in the inlet opening and which is arranged to influence the spool in the reverse direction, the spool comprises at least one second control pressure surface which is in continuous connection with the pressure prevailing in the outlet opening and which is arranged to influence the spool in the inlet direction, the outlet opening is provided with at least one throttle to generate a pressure difference between the inlet opening and the outlet opening, the resultant force of the first control pressure surface and the second control pressure surface influencing in opposite directions is dependent on said pressure difference, and the axial position of the spool is arranged to be determined on the basis of the mutual relation of said resultant force and the force generated by the force member.

4. A rock breaking device according to claim 1, wherein the spool comprises at least one first control pressure surface which is in continuous connection with the pressure prevailing in the inlet opening and which is arranged to influence the spool in the reverse direction, the spool comprises at least one second control pressure surface which is in continuous connection with the pressure prevailing in the outlet opening and which is arranged to influence the spool in the inlet direction, the outlet opening is provided with at least one throttle to generate a pressure difference between the inlet opening and the outlet opening, the resultant force of the first control pressure surface and the second control pressure surface influencing in opposite directions is dependent on said pressure difference, and the axial position of the spool is arranged to be determined on the basis of the mutual relation of said resultant force and the force generated by the force member, the protection valve is provided with at least one relief valve which is in continuous connection with the second control pressure surface, the relief valve is arranged to open a connection to the tank of the hydraulic system when the pressure of the pressure fluid led through the protection valve exceeds a preset pressure limit, and opening of the relief valve is arranged to reduce the force generated by the second control pressure surface, whereby the spool is arranged to move, due to the effect of the force influencing the first control pressure surface, to the third coupling point, irrespective of the volume flow fed through the protection valve.

5. A rock breaking device according to claim 1, wherein the breaking device is a breaking hammer.

6. A rock breaking device according to claim 1, wherein the breaking device is a rock drilling machine.

7. A rock breaking device according to claim 1, wherein the spool of the protection valve is arranged to prevent pressure fluid flow through the protection valve at the third coupling point whereby the percussion device is stopped.

8. A rock breaking device according to claim 1, wherein the spool of the protection valve is arranged to throttle pressure fluid flow through the protection valve at the third coupling point whereby the percussion device has lower impact frequency.

9. A rock breaking device according to claim 1, wherein the spool is arranged to reach a critical position when being moved towards the third coupling point, and once the critical position has reached the outlet opening is closed inevitably and quickly.

10. A protection valve comprising:

a body, at least one inlet opening for feeding hydraulic fluid to a protection valve, at least one outlet opening for feeding hydraulic fluid from the protection valve to the inlet channel of a hydraulic auxiliary device, a spool arranged to move in the inlet direction of the flow and in the reverse direction of the flow, at least one force member for moving the spool towards the inlet direction, at least one control pressure surface in the spool, the pressure of the pressure fluid influencing the control pressure surface being arranged to generate a force to move the spool axially, at least one collar in the spool, the collar being arranged to open and close a connection between the inlet opening and the outlet opening, the spool comprises at least one first control pressure surface in continuous connection with the pressure in the inlet opening and arranged to influence the spool in the reverse direction, the spool comprises at least one second control pressure surface in continuous connection with the pressure in the outlet opening and arranged to influence the spool in the inlet direction, the outlet opening is provided with at least one throttle to provide a pressure difference between the inlet opening and the outlet opening, the magnitude of the pressure difference being dependent on the magnitude of the fed volume flow, the magnitude of the resultant force of the first control pressure surface and the second control pressure surface in the reverse direction is dependent on said pressure difference, the axial position of the spool is arranged to be determined on the basis of the mutual relation of said resultant force and the force provided by a force member, the spool of the protection valve has three predetermined axial coupling points, at the first coupling point a first collar of the spool is arranged to prevent a pressure fluid flow from the inlet opening to the outlet opening, at the second coupling point there is an open connection from the inlet opening to the outlet opening when the resultant force and the force provided by the force member, influencing the spool, are in balance, and wherein at the third coupling point a second collar of the spool is arranged to prevent, at least partly, pressure fluid flow from the inlet opening to the outlet opening when the resultant force influencing the spool is greater than the force provided by the force member.

11. A protection valve according to claim 10, wherein the protection valve is provided with at least one bypass channel through which a flow of pressure fluid smaller than a normal volume flow can be led in the inlet direction when the spool is in the third coupling point.

12. A protection valve according to claim 10, wherein the protection valve is provided with at least one relief valve which is in continuous connection with the second control pressure surface, and the relief valve is arranged to open a connection to a channel leading to a tank when the pressure of the pressure fluid led through the protection valve exceeds a preset pressure limit.

13. A method of operating a hydraulic rock breaking device, the method comprising:

feeding hydraulic fluid along an inlet channel in the inlet direction of the flow to a percussion device of a rock breaking device to generate and transmit impact pulses to a tool connected to the rock breaking device, controlling the operating cycle of the percussion device by means of at least one control valve, preventing, by means of at least one valve, pressure fluid from flowing back in the reverse direction when the percussion device has been stopped, leading the pressure fluid flowing to the percussion device through at least one protection valve in the inlet direction, monitoring the volume flow of the pressure fluid fed to the percussion device by means of said protection valve, and preventing, at least partly, pressure fluid flow through the protection valve if the volume flow fed to the percussion device exceeds a preset maximum volume flow determined by the protection valve.

14. A method according to claim 13, comprising
preventing the flow of pressure fluid through the protection valve completely if a flow larger than the maximum volume flow is fed to the percussion device, as a result of which the percussion device stops.

15. A method according to claim 13, comprising
allowing a reduced flow of pressure fluid through the protection valve if a flow larger than the maximum volume flow is fed to the percussion device, due to which the percussion device operates at a lower impact frequency than normally.

16. A method according to claim 13, comprising
throttling the pressure fluid flow led through the protection valve, whereby a pressure difference is generated before a throttle and after the throttle, the pressure difference being dependent on the fed volume flow, using the information on the pressure difference in controlling the protection valve, and preventing, at least partly, the flow of pressure fluid through the protection valve if the pressure before the throttle relative to the pressure after the throttle exceeds a predetermined pressure difference.

17. A method according to claim 13, comprising
preventing the pressure fluid from flowing back in the reverse direction by means of the protection valve.

18. A method according to claim 13, comprising
operating the percussion device with cold pressure fluid having a first viscosity, throttling the pressure fluid flow led through the protection valve, whereby a pressure difference is generated between the inlet side and the outlet side of the throttle, the pressure difference being dependent on the fed volume flow and the viscosity of the fed pressure fluid, allowing only a partial flow of pressure fluid through the protection valve if the pressure of the inlet side of the throttle relative to the pressure of the outlet side exceeds the pressure difference predetermined for the protection valve, allowing the pressure of the pressure fluid of the hydraulic system to increase due to the effect of the restricted flow, whereby the temperature of the pressure fluid increases due to the effect of the losses generated and reaches a second viscosity, which is lower than said first viscosity, and allowing a complete flow of pressure fluid through the protection valve when the pressure of the inlet side of the throttle relative to the pressure of the outlet side reaches the pressure difference predetermined for the protection valve after the viscosity of the pressure fluid has decreased.

19. A method according to claim 13, comprising
monitoring the pressure of the pressure fluid fed to the percussion device by means of a relief valve in connection with the protection valve, and preventing, at least partly, the flow of the pressure fluid through the protection valve if the pressure fed to the percussion device exceeds the preset pressure determined by the protection valve.

* * * * *